(12) United States Patent
Krohn

(10) Patent No.: US 7,067,462 B2
(45) Date of Patent: Jun. 27, 2006

(54) UV CURABLE LUBRICANT COMPOSITIONS

(75) Inventor: Roy C. Krohn, Fort Gratiot, MI (US)

(73) Assignee: Allied PhotoChemical, Inc., Kimball, MI (US)

( * ) Notice: Subject to any disclaimer, the term of this patent is extended or adjusted under 35 U.S.C. 154(b) by 334 days.

(21) Appl. No.: 10/164,338

(22) Filed: Jun. 5, 2002

(65) Prior Publication Data

US 2003/0017954 A1 Jan. 23, 2003

Related U.S. Application Data

(63) Continuation-in-part of application No. PCT/US00/42603, filed on Dec. 6, 2000.

(60) Provisional application No. 60/169,248, filed on Dec. 6, 1999.

(51) Int. Cl.
C10M 141/10 (2006.01)
C10M 145/14 (2006.01)

(52) U.S. Cl. ............... 508/181; 508/246; 508/421; 508/469; 508/470; 508/471

(58) Field of Classification Search ............... 508/181, 508/246, 421, 469, 470, 471
See application file for complete search history.

(56) References Cited

U.S. PATENT DOCUMENTS

| | | | |
|---|---|---|---|
| 3,700,754 A | 10/1972 | Schmitt et al. | |
| 3,953,643 A | 4/1976 | Cheung et al. | |
| 3,968,056 A | 7/1976 | Bolon et al. | |
| 3,988,647 A | 10/1976 | Bolon et al. | |
| 4,049,844 A | 9/1977 | Bolon et al. | |
| 4,088,801 A | 5/1978 | Bolon et al. | |
| 4,113,894 A | 9/1978 | Koch, II | |
| 4,187,340 A | 2/1980 | Oishi et al. | |
| 4,188,449 A | 2/1980 | Lu et al. | |
| RE30,274 E | 5/1980 | Bolon et al. | |
| 4,256,591 A | 3/1981 | Yamamoto et al. | |
| 4,271,212 A | 6/1981 | Stengle | |
| 4,338,376 A | 7/1982 | Kritzler | |
| 4,391,858 A | 7/1983 | Batzill | |
| RE31,411 E | 10/1983 | Bolon et al. | |
| 4,420,500 A | 12/1983 | Nakatani et al. | |
| 4,439,494 A | 3/1984 | Olson | |
| 4,455,205 A | 6/1984 | Olson et al. | |
| 4,478,876 A | 10/1984 | Chung | |
| 4,479,860 A | 10/1984 | Hayase et al. | |
| 4,495,042 A | 1/1985 | Hayase et al. | |
| 4,496,475 A | 1/1985 | Abrams | |
| 4,513,023 A | 4/1985 | Wary | |
| 4,533,445 A | 8/1985 | Orio | |
| 4,539,258 A | 9/1985 | Panush | |
| 4,547,410 A | 10/1985 | Panush et al. | |
| 4,551,361 A | 11/1985 | Burzynski et al. | |
| 4,557,975 A | 12/1985 | Moore | |
| 4,594,315 A | 6/1986 | Shibue et al. | |
| 4,640,981 A | 2/1987 | Dery et al. | |
| 4,665,342 A | 5/1987 | Topp et al. | |
| 4,666,821 A | 5/1987 | Hein et al. | |
| 4,684,353 A | 8/1987 | deSouza | |
| 4,738,899 A | 4/1988 | Bluestein et al. | |
| 4,788,108 A | 11/1988 | Saunders, Jr. et al. | |
| 4,806,257 A | 2/1989 | Clark et al. | |
| 4,814,208 A | 3/1989 | Miyazaki et al. | |
| 4,816,717 A | 3/1989 | Harper et al. | |
| 4,822,646 A | 4/1989 | Clark et al. | |
| 4,828,758 A | 5/1989 | Gillberg-Laforce et al. | |
| 4,900,763 A | 2/1990 | Kraushaar | |
| 4,911,796 A | 3/1990 | Reed | |
| 4,959,178 A | 9/1990 | Frentzel et al. | |
| 4,960,614 A | 10/1990 | Durand | |
| 4,964,948 A | 10/1990 | Reed | |
| 4,975,471 A | 12/1990 | Hayase et al. | |
| 5,006,397 A | 4/1991 | Durand | |
| 5,049,480 A | 9/1991 | Nebe et al. | |
| 5,068,714 A | 11/1991 | Seipler | |
| 5,076,963 A | 12/1991 | Kameyama et al. | |
| 5,100,848 A | 3/1992 | Enomoto et al. | |
| 5,104,929 A | 4/1992 | Bilkadi | |
| 5,116,639 A | 5/1992 | Kolk et al. | |
| 5,128,387 A * | 7/1992 | Shustack | ............ 522/92 |
| 5,128,391 A | 7/1992 | Shustack | |
| 5,149,971 A | 9/1992 | McElhaney et al. | |
| 5,180,523 A | 1/1993 | Durand et al. | |
| 5,180,757 A | 1/1993 | Lucey | |
| 5,183,831 A | 2/1993 | Bielat et al. | |
| 5,221,560 A | 6/1993 | Perkins et al. | |
| 5,225,170 A | 7/1993 | Kolk et al. | |
| 5,282,985 A | 2/1994 | Zabinski et al. | |
| 5,296,295 A | 3/1994 | Perkins et al. | |
| 5,326,636 A | 7/1994 | Durand et al. | |
| 5,356,545 A | 10/1994 | Wayte | |
| 5,384,160 A | 1/1995 | Frazzitta | |
| 5,395,876 A | 3/1995 | Frentzel et al. | |
| 5,424,182 A | 6/1995 | Marginean, Sr. et al. | |
| 5,453,451 A | 9/1995 | Sokol | |
| 5,454,892 A | 10/1995 | Kardon et al. | |
| 5,462,701 A | 10/1995 | Hagemeyer et al. | |
| 5,470,643 A | 11/1995 | Dorfman | |

(Continued)

FOREIGN PATENT DOCUMENTS

DE 198 35 917 A1 2/2000

(Continued)

Primary Examiner—Elizabeth D. Wood
(74) Attorney, Agent, or Firm—Brooks Kushman PC

(57) ABSTRACT

The present invention discloses an ultraviolet light curable lubricating composition and method for making such a composition that may be used to produce a lubricating layer. The disclosed composition does not contain any significant amount of volatile organic solvents that do not become incorporated in the lubricating layer after curing.

15 Claims, No Drawings

U.S. PATENT DOCUMENTS

| | | |
|---|---|---|
| 5,470,897 A | 11/1995 | Meixner et al. |
| 5,514,214 A | 5/1996 | Joel et al. |
| 5,523,143 A | 6/1996 | Hagemeyer et al. |
| 5,556,527 A | 9/1996 | Igarashi et al. |
| 5,561,730 A | 10/1996 | Lochkovic et al. |
| 5,565,126 A | 10/1996 | Kimura et al. |
| 5,587,433 A | 12/1996 | Boeckeler |
| 5,596,024 A | 1/1997 | Horie et al. |
| 5,609,918 A | 3/1997 | Yamaguchi et al. |
| 5,624,486 A | 4/1997 | Schmid et al. |
| 5,633,037 A | 5/1997 | Mayer |
| 5,686,792 A | 11/1997 | Ensign, Jr. |
| 5,698,310 A | 12/1997 | Nakamura et al. |
| 5,716,551 A | 2/1998 | Unruh et al. |
| 5,718,950 A | 2/1998 | Komatsu et al. |
| 5,747,115 A | 5/1998 | Howell et al. |
| 5,750,186 A | 5/1998 | Frazzitta |
| 5,773,487 A | 6/1998 | Sokol |
| 5,784,197 A | 7/1998 | Frey et al. |
| 5,787,218 A | 7/1998 | Ohtaka et al. |
| 5,833,724 A * | 11/1998 | Wei et al. .................. 51/307 |
| 5,837,745 A | 11/1998 | Safta et al. |
| 5,866,628 A | 2/1999 | Likavec et al. |
| 5,871,827 A | 2/1999 | Jaffe et al. |
| 5,883,148 A | 3/1999 | Lewandowski et al. |
| 5,888,119 A | 3/1999 | Christianson et al. |
| 5,914,162 A | 6/1999 | Bilkadi |
| 5,942,284 A | 8/1999 | Hiskes et al. |
| 5,945,502 A | 8/1999 | Hsieh et al. |
| 5,950,808 A | 9/1999 | Tanabe et al. |
| 5,968,996 A | 10/1999 | Sanchez et al. |
| 5,994,424 A | 11/1999 | Safta et al. |
| 6,054,501 A | 4/2000 | Taniguchi et al. |
| 6,165,386 A | 12/2000 | Endo et al. |
| 6,211,262 B1 | 4/2001 | Mejiritski et al. |
| 6,261,645 B1 | 7/2001 | Betz et al. |
| 6,267,645 B1 | 7/2001 | Burga et al. |
| 6,290,881 B1 | 9/2001 | Krohn |
| 6,444,713 B1 * | 9/2002 | Pachl et al. .................. 521/54 |

FOREIGN PATENT DOCUMENTS

| | | |
|---|---|---|
| EP | 0 081 323 A1 | 6/1983 |
| EP | 0 530 141 A1 | 3/1993 |
| EP | 0 567 940 A1 | 11/1993 |
| EP | 0 711 801 A2 | 5/1996 |
| EP | 0 820 217 A1 | 1/1998 |
| GB | 1 550 382 | 8/1979 |
| WO | WO 97/31051 | 8/1997 |
| WO | WO 97/45458 | 12/1997 |
| WO | WO 98/47954 | 10/1998 |
| WO | WO 98/50317 | 11/1998 |
| WO | WO 00/62586 | 10/2000 |

* cited by examiner

UV CURABLE LUBRICANT COMPOSITIONS

CROSS-REFERENCE TO RELATED APPLICATION

This application is a continuation-in-part of International Application Ser. No. PCT/US00/42603, filed Dec. 6, 2000, now abandoned, which, in turn, claims the benefit of U.S. provisional patent application Ser. No. 60/169,248, filed Dec. 6, 1999, now abandoned.

TECHNICAL FIELD

The present invention relates to ultraviolet light (uv) curable compositions capable of producing coating with enhanced lubricative properties.

BACKGROUND OF THE INVENTION

Lubricating coatings are thin film coatings that increase the lifetime of a substrate by reducing damage caused by wear. Such solid coatings are required in applications where components are subjected to harsh environmental conditions such as high temperatures and intense radiation. Lubricating coatings find utility in precision applications which include but are not limited to machine tools (e.g. drill bits, end mills, etc.), close tolerance gimbals, bearings, shafts, and gears. Additionally, lubricating coatings are applied to wood surfaces which are subjected to friction. The use of lubricating coatings reduce the amount of friction between moving parts resulting in decreased heat production, stress, surface deformation and fatigue forces.

Many methods exist for depositing solid coatings onto a substrate. For example, coatings have been rubbed, bonded, thermally sprayed, and laser deposited onto substrates. Additionally, sputter deposition has been commonly used to coat substrates.

By utilizing any of these methods, film quality is limited and environmental concerns exist. For example, sputter deposition leads to contamination by background gases. Contamination can compromise film integrity and limit control of the film properties. Additionally, these methods typically require the use of organic solvents that contain a significant amount of volatile organic compounds (VOCs). These VOCs escape into the atmosphere while the composition dries. Such solvent based systems are undesirable because of the hazards and expenses associated with VOCs. The hazards include water and air pollution and the expenses include the cost of complying with strict government regulation on solvent emission levels.

In contrast, UV curable compositions contain reactive monomers instead of solvents; thus eliminating the detrimental effects of VOCs. UV compositions are cured through rapid photo-induced polymerizations without the use of solvents which emit VOCs. Since the UV curing process is essentially solvent free, the necessity for time consuming and expensive pollution abatement procedures is greatly reduced.

Additionally, UV curable lubricating coatings offer several other benefits. First, faster cure times offer substantial economic benefits. Furthermore, heat sensitive materials can be safely coated and cured with UV light without thermal degradation of heat sensitive substrates. Finally, UV light is a relatively low cost source of energy due to its widespread availability.

Although UV curable lubricant coatings are superior to thermally cured coatings, there are still disadvantages inherent in UV curable coatings. Since UV curable coatings require compositions which have high molecular weight and viscosity, it is difficult to apply the composition through spraying and brushing. Additionally, many UV curable lubricant coatings require compositions that are prone to dispersion and instability. By using these compositions, the curing results in an uneven and blemished coating.

Accordingly, there exists a need to provide environmentally safe UV curable lubricant coatings with enhance physical properties for use on substrates subjected to harsh environmental conditions. Additionally, there is a need to provide a method of applying the coatings which furthers the goal of improved performance.

SUMMARY OF INVENTION

The present invention discloses an ultraviolet light curable lubricating composition and method for making such a composition that may be used to produce a lubricating layer. The disclosed composition does not contain any significant amount of volatile organic solvents that do not become incorporated in the lubricating layer after curing. Specifically, the lubricating composition contains 5% or less volatile organic solvents by weight.

In accordance with one aspect of the invention, an ultraviolet light curable lubricating composition is provided. The lubricating composition comprises a teflon composition, a photocurable organic mixture, and a photoinitiator. The teflon composition is preferably present in an amount of about 15% to 40% of the total weight of the lubricating composition. All percentages of the lubricating composition as expressed in this document refer to the weight percentage of the stated component to the total weight of the lubricating composition in its fluid state at standard temperature and pressure. The photoinitiator is present in an amount of about 2% to 8% of the total weight of lubricating composition. The photocurable organic mixture comprises a mixture of one or more aliphatic acrylated oligomers, wherein the aliphatic acrylated oligomer mixture is present in an amount of about 10% to 45% of the total weight of lubricating composition. The photocurable organic mixture of lubricating composition preferably further comprises an acrylated epoxy oligomer in an amount of about 2% to 8% of the weight of the lubricating composition, an isobornyl acrylate monomer in an amount of about 15% to 60% of weight of the lubricating composition. The lubricating composition optionally further comprises a flowing promoting agent in an amount of 0.1% to 8% of the total weight of the lubricating composition.

In accordance with yet another aspect of the invention, a method is provided for depositing a lubricating coating on a substrate. The method comprises a first step of applying to the substrate a lubricating fluid-phase composition ("lubricating composition"). The lubricating composition comprises the composition described above.

The method also includes a second step of illuminating the lubricating composition on the substrate with an ultraviolet light to cause the lubricating composition to cure into the lubricating coating.

In accordance with this method, the lubricating composition can be selectively deposited on the substrate at specific locations where lubricating plating is desired. It need not be applied to the entire substrate.

BEST MODE FOR CARRYING OUT THE INVENTION

Lubricating Compositions

Reference will now be made in detail to presently preferred compositions or embodiments and methods of the invention, which constitute the best modes of practicing the invention presently known to the inventor.

The term "alkyl" means a straight or branched hydrocarbon radical having from 1 to 12 carbon atoms and includes, for example, methyl, ethyl, n-propyl, isopropyl, n-butyl, sec-butyl, isobutyl, tert-butyl, n-pentyl, n-hexyl, n-heptyl, n-octyl, n-nonyl, n-decyl, undecyl, dodecyl, and the like.

The term "cycloalkyl" means a saturated hydrocarbon ring which contains from 3 to 20 carbon atoms, for example, cyclopropyl, cyclobutyl, cyclopentyl, cyclohexyl, adamantyl, isobornyl, and the like. Cycloalkyl also includes multicycyclic groups such as bicyclic and tricyclic alkyl groups.

The term "cycloalkenyl" means hydrocarbon ring having at least one unsaturation which contains from 5 to 20 carbon atoms. Cycloalkenyl also includes multicycyclic groups such as bicyclic and tricyclic groups having at least one unsaturation.

The terms "alkoxy" and "thioalkoxy" are O-alkyl or S-alkyl as defined above for alkyl.

The term "aryl" means an aromatic radical. Example of aryl include a phenyl group, a naphthyl group, a phenyl group substituted by 1 to 4 substituents selected from alkyl as defined above, alkoxy as defined above, thioalkoxy as defined above, hydroxy, halogen, trifluoromethyl, amino, alkylamino as defined above for alkyl, dialkylamino as defined for alkyl, N-acetylamino, cyano —$SO_2NH_2$, or nitro, or a naphthyl group substituted by 1 to 4 substituents as defined above for a phenyl group substituted by 1 to 4 substituents.

The term "acrylated aliphatic oligomer" means acrylic acrylates, amine modified polyether acrylates, chlorinated polyester acrylates, melamine acrylates, polybutadiene acrylates, polyester acrylates, polyether acrylates, and urethane acrylates. Epoxy acrylates, silicon acrylates, and fluorinate acrylates are not included in the definition of acrylated aliphatic oligomer.

In accordance with one aspect of the invention, a presently preferred ultraviolet light curable lubricating composition ("lubricating composition") is provided. In this preferred embodiment, the lubricating composition comprises a teflon composition, a photocurable organic mixture, and a photoinitiator. The photocurable organic mixture comprises a mixture of at least one aliphatic acrylated oligomer. The selection of the ingredients for the lubricating composition and the relative percentages of such ingredients is partially dictated by the requirement that the composition be applied to a substrate by such processes as screen printing, dipping, spray, brushing, and flexographic techniques. Accordingly, such physical characteristics as viscosity and density are important in defining the lubricating composition of the present invention. The lubricating composition of the present invention preferably has a viscosity from about 4,000 cps to about 140,000 cps. More preferably, the viscosity is about 40,000 cps to about 120,00 cps, and most preferably about 70,000 cps to about 90,000 cps. The lubricating composition is further characterized by density. Preferably, the density is 6 lb./gallon to 16 lbs./gallon; and more preferably the density is 9 lb./gallon to 13 lb/gallon.

The teflon composition of the lubricating composition is preferably a free-flowing PTFE powder. The preferred PTFE powder has an average particle size from 0.3 µm to 30 µm and more preferably from 4 µm to 12 µm. In one particular variation of the present invention, the PTFE powder has an average particle size of 4 µm with a particle distribution such that approximately 10% of the particles are less than 0.3 µm and approximately 90% of the particles are less than 8 µm. In another particular variation of the present invention, the PTFE powder has an average particle size of 12 µm with a particle distribution such that approximately 10% of the particles are less than 3 µm and approximately 90% of the particles are less than 25 µm. In still another particular variation of the present invention, the PTFE powder has an average particle size of 12 µm with a particle distribution such that approximately 10% of the particles are less than 3 µm and approximately 90% of the particles are less than 30 µm. The PTFE powder may also be characterized by average bulk density. Preferably, the average bulk density of the PTFE powder is from about 200 g/L to about 600 g/L and more preferably from about 300 g/L to about 500 g/L. Suitable PTFE powders include Zonyl MP 1000 Fluoroadditive, Zonyl MP 1100 Fluoroadditive, and Zonyl MP 1300 Fluoroadditive, commercially available from Du Pont Company, Wilmington, Del. The teflon composition is preferably present in an amount of about 15% to 40% of the weight of the lubricating composition. If the lubricating composition is applied by screen printing, the teflon composition is more preferably present in an amount of about 25% to 35% of the weight of the lubricating composition, and most preferably about 31% of the weight of the lubricating composition. If the lubricating composition is applied by spraying, the teflon composition is more preferably present in an amount of about 15% to 25%, and most preferably about 21% of the weight of the lubricating composition.

The photocurable organic mixture of the lubricating composition preferably includes at least one aliphatic acrylated oligomer. The at least one aliphatic acrylated oligomer is preferably present in an amount of about 10% to 45% of the weight of the lubricating composition. If the lubricating composition is applied by screen printing, the aliphatic acrylated oligomer mixture is more preferably present in an amount of about 25% to 40% of the weight of the lubricating composition, and most preferably about 34% of the weight of the lubricating composition. If the lubricating composition is applied by spray techniques, the aliphatic acrylated oligomer mixture is more preferably present in an amount of about 11% to 21% of the weight of the lubricating composition, and most preferably about 16% of the weight of the lubricating composition. The aliphatic acrylated oligomer mixture preferably does not have fluorine or silicon. Moreover, the aliphatic acrylated oligomer preferably comprises one or more urethane oligomers. Suitable aliphatic acrylated oligomers include Radcure Ebecryl 244 (aliphatic urethane diacrylate diluted 10% with 1,6-hexanediol diacrylate), Ebecryl 264 (aliphatic urethane triacrylate diluted 15% with 1,6-hexanediol diacrylate) and Ebecryl 284 (aliphatic urethane diacrylate diluted 12% by weight with 1,6-hexanediol diacrylate) urethanes, commercially available from Radcure UCB Corp. of Smyrna, Ga.; Sartomer CN-961E75 (aliphatic urethane diacrylate blended with 25% ethoxylated trimethylol propane triacylate), CN-961H81 (aliphatic urethane diacrylate blended with 19% 2(2-ethoxyethoxy)ethyl acrylate), CN-963A80 (aliphatic urethane diacrylate blended with 20% tripropylene glycol diacrylate), CN-964 (aliphatic urethane diacrylate), CN-966A80 (aliphatic urethane diacrylate blended with 20% tripropylene glycol diacrylate), CN-982A75 (aliphatic urethane diacrylate blended with 25% tripropylene glycol diacrylate) and CN-983 (aliphatic urethane diacrylate), commercially available from Sartomer Corp. of Exton, Pa.; TAB FAIRAD 8010, 8179, 8205, 8210, 8216, 8264, M-E-15, UVU-316, commercially available from TAB Chemicals of Chicago, Ill.; and Echo Resin ALU-303, commercially available from Echo Resins of Versaille, Mo.; and Genomer 4652, commercially available from Rahn Radiation Curing of Aurora, Ill. The preferred aliphatic acrylated oligomers include Ebecryl 264 and Ebecryl 284. Ebecryl 264 is an aliphatic urethane triacrylate supplied as an 85% solution in hexanediol diacrylate. Ebecryl 284 is aliphatic urethane diacrylate of 1200 molecular weight diluted 10% with 1,6-hexanediol diacrylate. Combinations of these materials may also be employed herein.

The photocurable organic mixture of the lubricating composition preferably includes an acrylated epoxy oligomer. The acrylated epoxy oligomer is present in an amount of about 2% to 8% of the weight of the lubricating composition. If the lubricating composition is applied by screen printing, the acrylated epoxy oligomer is more preferably present in an amount of about 3% to 6% of the weight of the lubricating composition, and most preferably about 5% of the weight of the lubricating composition. If the lubricating composition is applied by spraying, the acrylated epoxy oligomer is more preferably present in an amount of about 3% to 6% of the weight of the lubricating composition, and most preferably about 4% of the weight of the lubricating composition. Suitable acrylated epoxy oligomers include Radcure Ebecryl 3603 (novolac epoxy acrylate diluted 20% with tripropylene glycol diacrylate), commercially available from Radcure UCB Corp.; Sartomer CN-120 (difunctional bisphenol based epoxy acrylate) and CN-124 (difunctional bisphenol based epoxy acrylate), commercially available from Sartomer Corp.; and Echo Resin TME 9310 and 9345, commercially available from Echo Resins. The preferred acrylated epoxy oligomer is Ebecryl 3603, which tri-functional acrylated epoxy novolac. Combinations of these materials may also be employed herein.

The photocurable mixture of the lubricating composition preferably includes an ethylenically unsaturated monomer having Formula I:

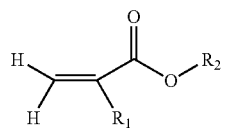

wherein $R_1$ is hydrogen or substituted or unsubstituted alkyl; and $R_2$ is substituted or unsubstituted alkyl having more than 4 carbon atoms, cycloalkyl, cycloalkenyl, or substituted or unsubstituted aryl. Preferably $R_1$ is hydrogen or methyl; and $R_2$ is isoborynl, phenyl, benzyl, dicylcopentenyl, diclypentenyl oxyethyl, cyclohexyl, and naphthyl. The most preferred ethyleneically unsaturated monomers are isobornyl acrylate monomers. The isobornyl acrylate monomers is preferably present in an amount of about 15% to 60% of the weight of the lubricating composition. If the lubricating composition is applied by screen printing, the isobornyl acrylate monomer is more preferably present in an amount of about 15% to 30% of the weight of the lubricating composition, and most preferably about 23% of the weight of the lubricating composition. If the lubricating composition is applied by spraying, the isobornyl acrylate monomer is more preferably present in an amount of about 40% to 60% of the weight of the lubricating composition, and most preferably about 50% of the weight of the lubricating composition. Suitable isobornyl acrylate monomers include Sartomer SR-423 (isobornyl methacrylate):

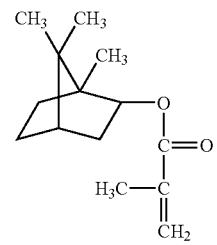

and SR-506 (isobornyl acrylate):

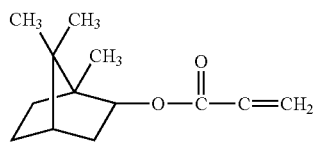

available from Sartomer Corp.; Radcure IBOA (isobornyl acrylate), commercially available from Radcure Corp.; IBOA and IBOMA, commercially available from CPS Chemical; and Genomer 1121, commercially available from Rahn Radiation Curing. The preferred isobornyl acrylate monomers is Radcure IBOA, commercially available from Radcure Corp. Combinations of these materials may also be employed herein.

This preferred lubricating composition also includes a photoinitiator. The photoinitiator is preferably present in an amount of about 2% to 8% of the weight of the lubricating composition. If the lubricating composition is applied by screen printing, the photoinitiator is more preferably present in an amount of about 3% to 7% of the weight of the lubricating composition, and most preferably about 5% of the weight of the lubricating composition. If the lubricating composition is applied by flexographic techniques, the photoinitiator is more preferably present in an amount of about 3% to 7% of the weight of the lubricating composition, and most preferably about 5% of the weight of the lubricating composition. Suitable photoinitiators include Irgacure 184 (1-hydroxycyclohexyl phenyl ketone); Irgacure 907 (2-methyl-1-[4-(methylthio)phenyl]-2-morpholino propan-1-one); Irgacure 369 (2-benzyl-2-N , N-dimethylamino-1-(4-morpholinophenyl)-1-butanone); Irgacure 500 (the combination of 50% 1-hydroxy cyclohexyl phenyl ketone and 50% benzophenone); Irgacure 651 (2,2-dimethoxy-2-phenyl acetophenone); Irgacure 1700 (the combination of bis(2,6-dimethoxybenzoyl-2,4-,4-trimethyl pentyl phosphine oxide and 75% 2-hydroxy-2-methyl-1-phenyl-propan-1-one); DAROCUR 1173 (2-hydroxy-2-methyl-1-phenyl-1-propanone) and DAROCUR 4265 (the combination of 50% 2,4,6-trimethylbenzoyldiphenyl-phosphine oxide and 50% 2-hydroxy 2-methyl-1-phenyl-propan-1-one), available commercially from Ciba-Geigy Corp., Tarrytown, N.Y.; CYRACURE UVI-6974 (mixed triaryl sulfonium hexafluoroantimonate salts) and CYRACURE UVI-6990 (mixed triaryl sulfonium hexafluorophosphate salts) available commercially from Union Carbide Chemicals and Plastics Co. Inc., Danbury, Conn.; and Genocure CQ, Genocure BOK, and Genocure M.F., commercially available from Rahn Radiation Curing. The preferred photoinitiator is Irgacure 1700 commercially available from Ciba-Geigy of Tarrytown, N.Y. Combinations of these materials may also be employed herein.

The lubricating composition of the present invention optionally includes a flow promoting agent in an amount of about 0.0% to 8% of the weight of the lubricating composition. Preferably, the flow promoting agent is present in an amount of about 0.1% to 8% of the weight of the lubricating composition. If the lubricating composition is applied by screen printing, the flow promoting is more preferably present in an amount of about 1% to 7% of the weight of the lubricating composition, and most preferably about 3% of the weight of the lubricating composition. If the lubricating composition is applied by spraying, the flow promoting agent is more preferably present in an amount of about 3% to 7% of the weight of the lubricating composition, and most preferably about 4% of the weight of the lubricating composition. Suitable flow promoting agents include Genorad 17, commercially available from Rahn Radiation Curing; and Modaflow, commercially available from Monsanto Chemical Co., St. Louis, Mo. The preferred flow promoting agent is Modaflow which is an ethyl acrylate and 2-ethylhexyl acrylate copolymer that improves the flow of the composition. Combinations of these materials may also be employed herein.

To illustrate, the following example sets forth a presently preferred lubricating composition according to this aspect of the invention.

EXAMPLE 1

This example provides a preferred lubricating composition according to the invention that can be applied to a substrate by screen printing techniques. This composition when applied to a substrate with a 305 PE mesh produces a lubricating coating of about 25 microns. The lubricating composition was made from the following components:

| Component | Approximate Weight % |
| --- | --- |
| Ebecryl 264 | 16.9 |
| Ebecryl 284 | 16.9 |
| IBOA | 22.1 |
| Irgacure 1700 | 5.0 |
| Ebecryl 3603 | 4.5 |
| Modaflow | 3.3 |
| MP 1300 | 31.3 |
| Total | 100.00 |

In this example the IBOA and Irgacure 1700 are mixed in a pan with a propeller blade mixer for 30 seconds at a speed of 500 to 1000 rpm. In the next step, the Ebecryl 264, the Ebecryl 284, the Ebecryl 3603, and Modaflow are introduced into the pan and mixed for 1 to 2 minutes at a speed of 2000 rpm. In the final step, the MP1300 is introduced into the pan and mixed for 1 to 2 minutes at a speed of 5000 rpm. The temperature during mixing is monitored. The mixing is temporarily suspended if the temperature exceed 100° F.

EXAMPLE 2

This example provides a preferred lubricating composition according to the invention that can be applied to a substrate by spraying. The lubricating composition was made from the following components:

| Component | Approximate Weight % |
| --- | --- |
| Ebecryl 264 | 8.0 |
| Ebecryl 284 | 8.0 |
| IBOA | 50.0 |
| Irgacure 1700 | 5.0 |
| Ebecryl 3603 | 4.0 |
| Modaflow | 4.0 |
| MP 1300 | 21.0 |
| Total | 100.00 |

In this example the IBOA and Irgacure 1700 are mixed in a pan with a propeller blade mixer for 30 seconds at a speed of 500 to 1000 rpm. In the next step, the Ebecryl 264, the Ebecryl 284, the Ebecryl 3603, and Modaflow are introduced into the pan and mixed for 1 to 2 minutes at a speed of 2000 rpm. In the final step, the MP1300 is introduced into the pan and mixed for 1 to 2 minutes at a speed of 5000 rpm. The temperature during mixing is monitored. The mixing is temporarily suspended if the temperature exceed 100° F.

EXAMPLE 3

This example provides a preferred lubricating composition according to the invention that can be applied to a substrate in piston applications. The lubricating composition was made from the following components:

| Component | Approximate Weight % |
| --- | --- |
| Ebecryl 264 | 7.3 |
| Ebecryl 284 | 7.3 |
| IBOA | 45.5 |
| Irgacure 1700 | 4.5 |
| Ebecryl 3603 | 3.6 |
| Modaflow | 3.6 |
| MP 1300 | 19.1 |
| Pthalo Blue | 9.1 |
| Total | 100.00 |

In this example the IBOA and Irgacure 1700 are mixed in a pan with a propeller blade mixer for 30 seconds at a speed of 500 to 1000 rpm. In the next step, the Ebecryl 264, the Ebecryl 284, the Ebecryl 3603, and Modaflow are introduced into the pan and mixed for 1 to 2 minutes at a speed of 2000 rpm. In the next step, the MP1300 is introduced into the pan and mixed for 1 to 2 minutes at a speed of 2000 rpm. In the final step, the Pthalo Blue is added and mixed for 1 to 2 minutes at a speed of 2000 rpm. In this example, the Pthalo Blue is merely an additive that provides a blue color to the composition. The temperature during mixing is monitored. The mixing is temporarily suspended if the temperature exceed 100° F.

Method for Depositing a Coating on a Substrate

In accordance with still another aspect of the invention, a method is provided for depositing a lubricating coating on a suitable substrate. The method comprises a first step of applying a lubricating fluid-phase composition ("lubricating composition") to the substrate.

The lubricating composition comprises the compositions described above. The preferred lubricating compositions according to this method are those described herein, for example, including the compositions described in examples 1–3.

The lubricating composition may be applied to the substrate using a number of different techniques. Suitable substrates are preferably made from metal, wood, and plastic. Metal substrates such as drill bits, end mills, dies, and other metal tools used in metal working operations are particularly preferred. The lubricating composition may be applied, for example, by direct brush application, or it may be sprayed onto the substrate surface. It also may be applied using a screen printing technique. In such screen printing technique, a "screen" as the term is used in the screen printing industry is used to regulate the flow of liquid composition onto the substrate surface. The lubricating composition typically would be applied to the screen as the latter contacts the substrate. The lubricating composition flows through the silk screen to the substrate, whereupon it adheres to the substrate at the desired film thickness. Screen printing techniques suitable for this purpose include known techniques, but wherein the process is adjusted in ways known to persons of ordinary skill in the art to accommodate the viscosity, flowability, and other properties of the liquid-phase composition, the substrate and its surface properties, etc. Flexographic techniques, for example, using pinch rollers to contact the lubricating composition with a rolling substrate, also may be used.

The method includes a second step of illuminating the lubricating fluid-phase composition on the substrate with an ultraviolet light to cause the lubricating fluid-phase composition to cure into the lubricating coating. This illumination may be carried out in any number of ways, provided the ultraviolet light or radiation impinges upon the lubricating composition so that the lubricating composition is caused to polymerize to form the coating, layer, film, etc., and thereby cures.

Curing preferably takes place by free radical polymerization, which is initiated by an ultraviolet radiation source. The photoinitiator preferably comprises a photoinitiator, as described above.

Various ultraviolet light sources may be used, depending on the application. Preferred ultraviolet radiation sources for a number of applications include known ultraviolet lighting equipment with energy intensity settings of, for example, 125 watts, 200 watts, 300 watts, 400 watts, and 600 watts per square inch.

The present invention also provides an article formed by the method of the present invention in which a substrate with the lubricating composition followed by photocuring.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An ultraviolet (UV) curable lubricating composition for forming a coating on a substrate, the lubricating composition comprising:
   at least one aliphatic acrylated oligomer, wherein the aliphatic acrylated oligomer is not an epoxy acrylate, a silicon acrylate, or a fluorinate acrylate;
   a PTFE composition in an amount of about 15% to 40% of the weight of the lubricating composition; and
   a photoinitiator;
wherein the PTFE composition comprises PTFE powder particles with an average particle size from 0.3 μm to 30 μm and the lubricating composition does not contain any significant amount of volatile organic solvents that do not become incorporated in the coating after the composition is cured and wherein the density of the lubricating composition is from about 6 lb/gallon to about 16 lb/gallon.

2. The UV curable lubricating composition of claim 1, wherein the at least one aliphatic acrylated oligomer is present in an amount of about 10% to 45% of the weight of the lubricating composition.

3. The lubricating composition of claim 2 wherein the aliphatic acrylated oligomer in the mixture is selected from the group consisting of:
   a) aliphatic urethane diacrylate diluted 10% by weight with 1,6-hexanediol diacrylate;
   b) aliphatic urethane triacrylate diluted 15% by weight with 1,6-hexanediol diacrylate);
   c) aliphatic urethane diacrylate blended with 20% by weight tripropylene glycol diacrylate;
   d) aliphatic urethane diacrylate blended with 25% by weight ethoxylated trimethylol propane triacrylate;
   e) aliphatic urethane diacrylate blended with 19% by weight 2(2-ethoxyethoxy)ethyl acrylate;
   f) aliphatic urethane diacrylate blended with 20% by weight tripropylene glycol diacrylate;
   g) aliphatic urethane diacrylate blended with 20% by weight tripropylene glycol diacrylate;
   h) aliphatic urethane diacrylate blended with 25% by weight tripropylene glycol diacrylate; and
   i) aliphatic urethane diacrylate;
   j) and mixtures thereof.

4. The UV curable lubricating composition of claim 2, wherein the at least one aliphatic acrylated oligomer is at least one urethane oligomer.

5. The UV curable lubricating composition of claim 2, wherein the mixture further comprises an ethylenically unsaturated monomer.

6. The UV curable lubricating composition of claim 5, wherein the ethylenically unsaturated monomer is present in an amount in an amount of about 15% to 60% of the weight of the lubricating composition.

7. The lubricating composition of claim 5 wherein the ethylenically unsaturated monomer is selected form the group consisting of isobornyl acrylate, isobornyl methacrylate, and mixtures thereof.

8. The UV curable lubricating composition of claim 5 further comprising an acrylated epoxy oligomer.

9. The UV curable lubricating composition of claim 8 further a flow promoting agent.

10. The UV curable lubricating composition of claim 9 wherein:
   the acrylated epoxy oligomer is present in an amount of about 2% to 8% of the weight of the lubricating composition;
   the photoinitiator is present in an amount of about 2% to 8% of the weight of the lubricating composition; and
   a flow promoting agent in an amount of 0.1% to 8% of the weight of the paint composition.

11. The lubricating composition of claim 1 wherein the photoinitiator is selected from the group consisting of:
   1-hydroxycyclohexyl phenyl ketone;
   propan-1-2-methyl-1-[4-(methylthio)phenyl]-2-morpholino propan-1-one;
   the combination of 50% 1-hydroxy cyclohexyl phenyl ketone and 50% benzophenone;
   2,2-dimethoxy-1,2-diphenylethan-1-one;

the combination of 25% bis(2,6-dimethoxybenzoyl-2,4-,4-trimethyl pentyl phosphine oxide and 75% 2-hydroxy-2-methyl-1-phenyl-propan-1-one;

2-hydroxy-2-methyl-1-phenyl-1-propanone;

the combination of 50% 2,4,6-trimethylbenzoyldiphenyl-phosphine oxide and 50% 2-hydroxy 2-methyl-1-phenyl-propan-1-one; and mixed triaryl sulfonium hexafluoroantimonate salts, mixed triaryl sulfonium hexafluorophosphate salts, and mixtures thereof.

12. The lubricating composition of claim 8 wherein the acrylated epoxy oligomer is selected from the group consisting of:

novolac epoxy acrylate diluted 20% with tripropylene glycol diacrylate;

difunctional bisphenol based epoxy acrylate; and mixtures thereof.

13. The lubricating composition of claim 1 having a density from about 9 lb/gallon to 13 lb/gallon.

14. The lubricating composition of claim 1 having a viscosity from about 4,000 cps to about 140,000 cps.

15. The lubricating composition of claim 1 having a viscosity from about 70,000 cps to 90,000 cps.

\* \* \* \* \*